Figure 8:
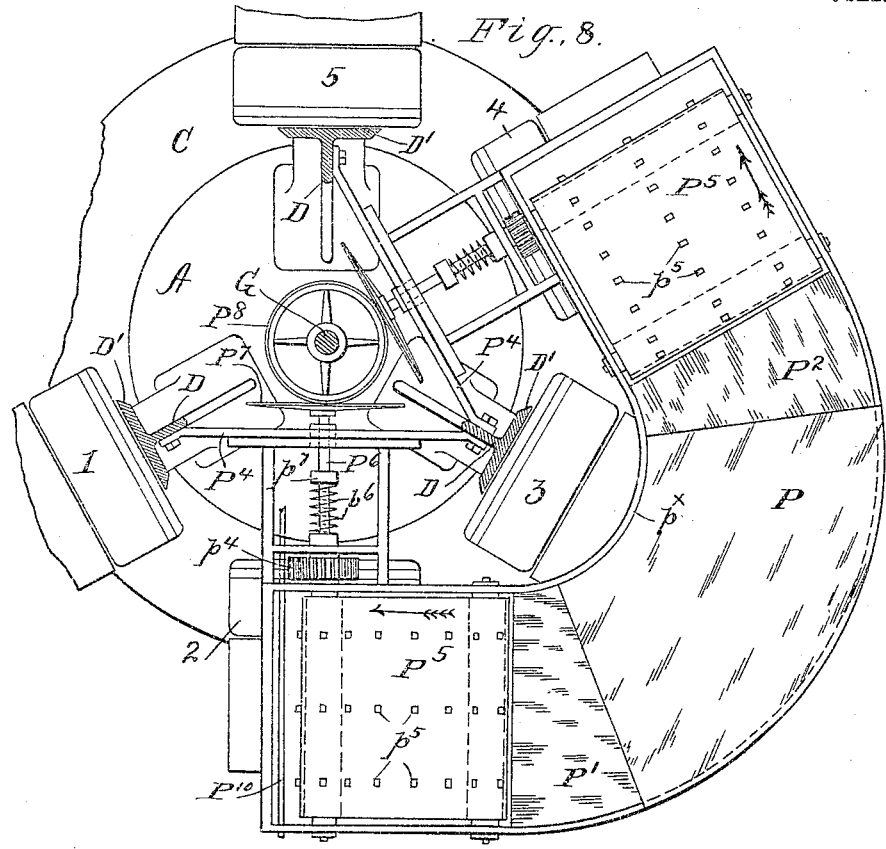

No. 778,564. PATENTED DEC. 27, 1904.
S. T. CAMERON.
BROOM MAKING MACHINE.
APPLICATION FILED JAN. 27, 1900.
6 SHEETS—SHEET 1.
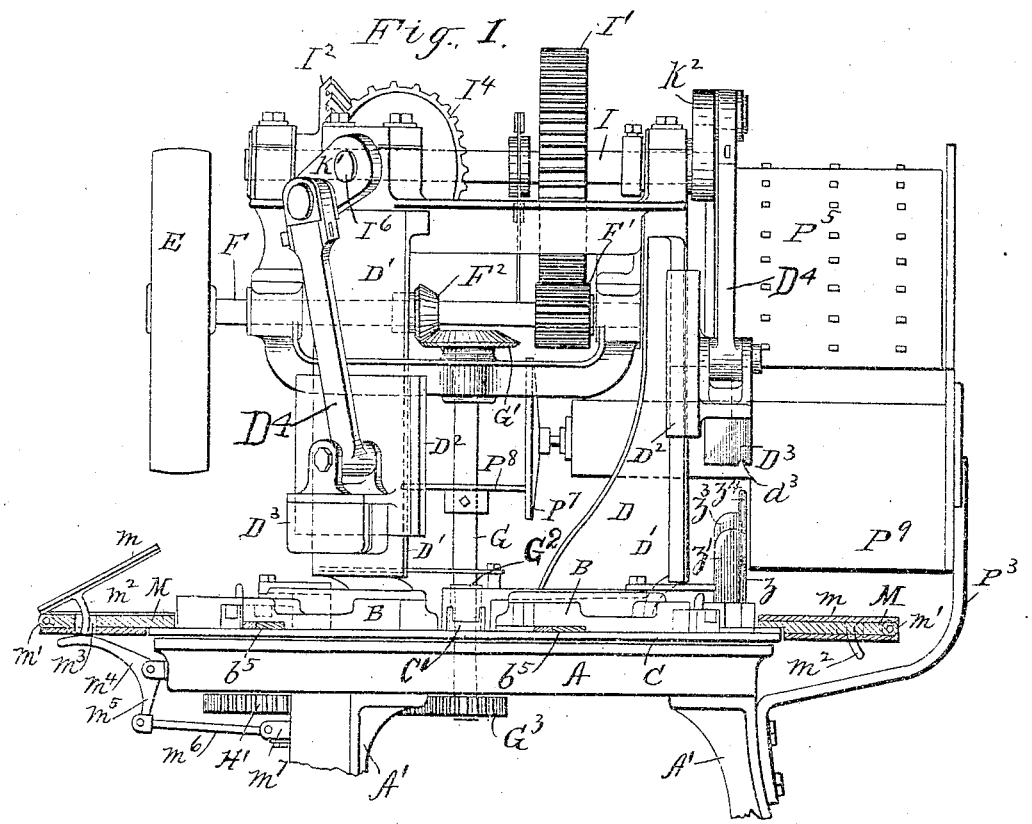
Fig. 1.
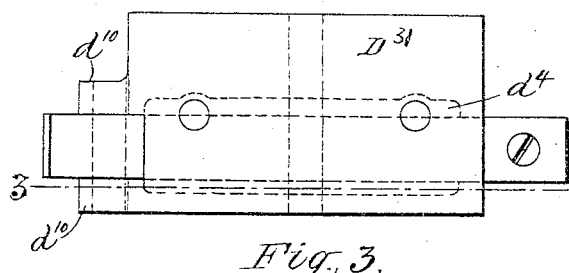
Fig. 2.
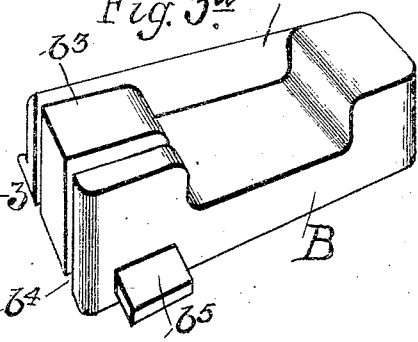
Fig. 3ª
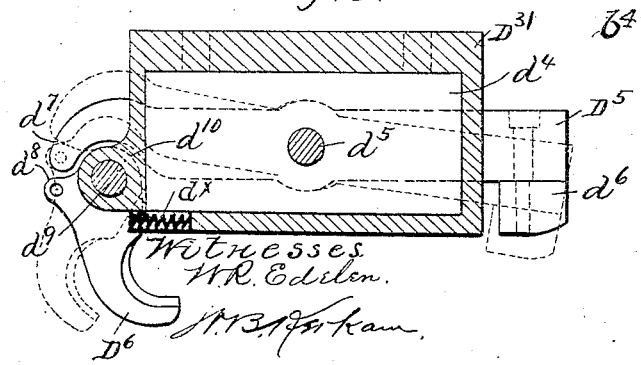
Fig. 3.
Witnesses
W. R. Edelen.
W. B. A. Iskam.
Inventor
S. T. Cameron No. 778,564. PATENTED DEC. 27, 1904.
S. T. CAMERON.
BROOM MAKING MACHINE.
APPLICATION FILED JAN. 27, 1900.
6 SHEETS—SHEET 2.
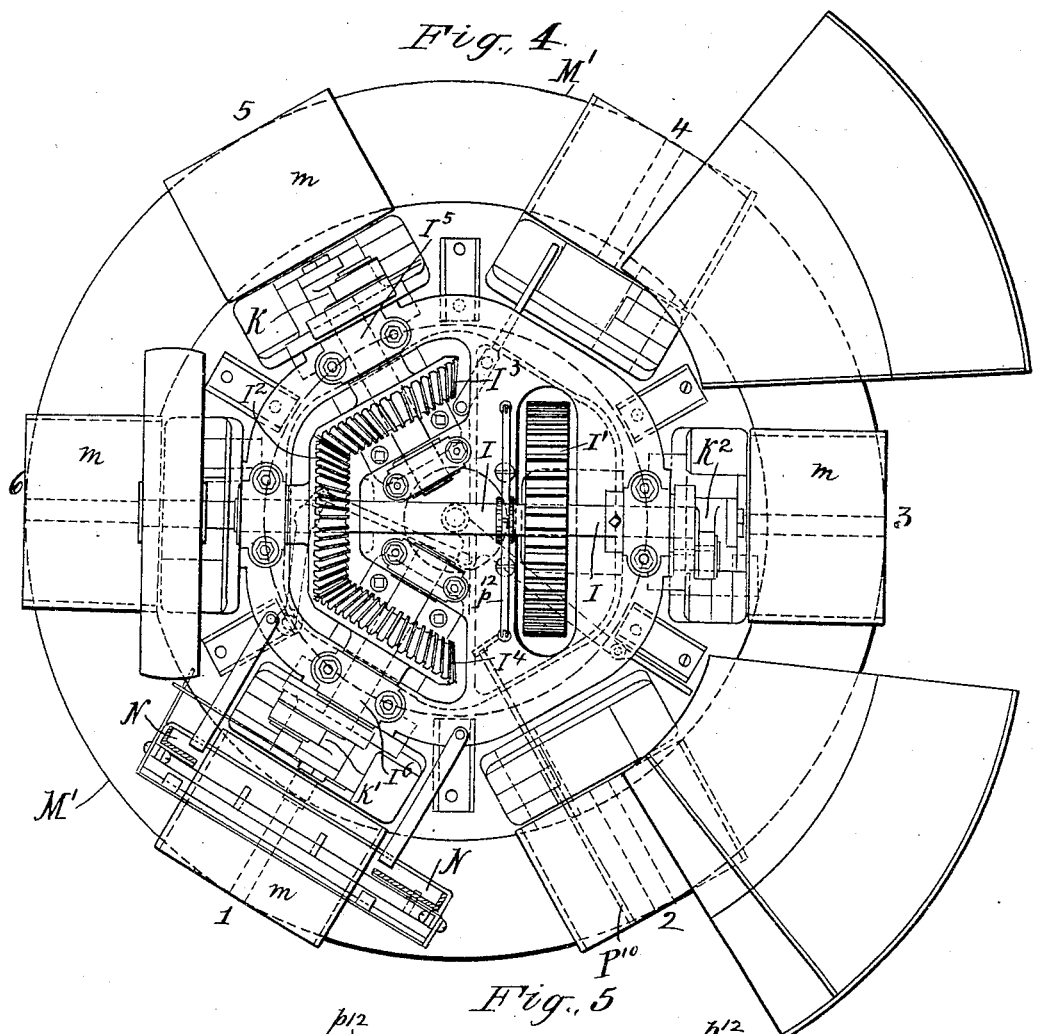
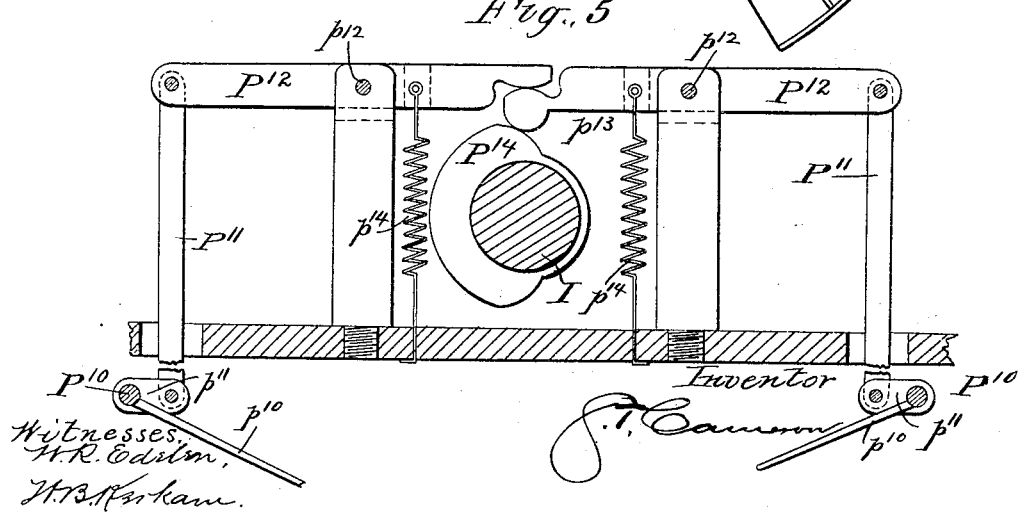

No. 778,564. PATENTED DEC. 27, 1904.
S. T. CAMERON.
BROOM MAKING MACHINE.
APPLICATION FILED JAN. 27, 1900.
6 SHEETS—SHEET 3.
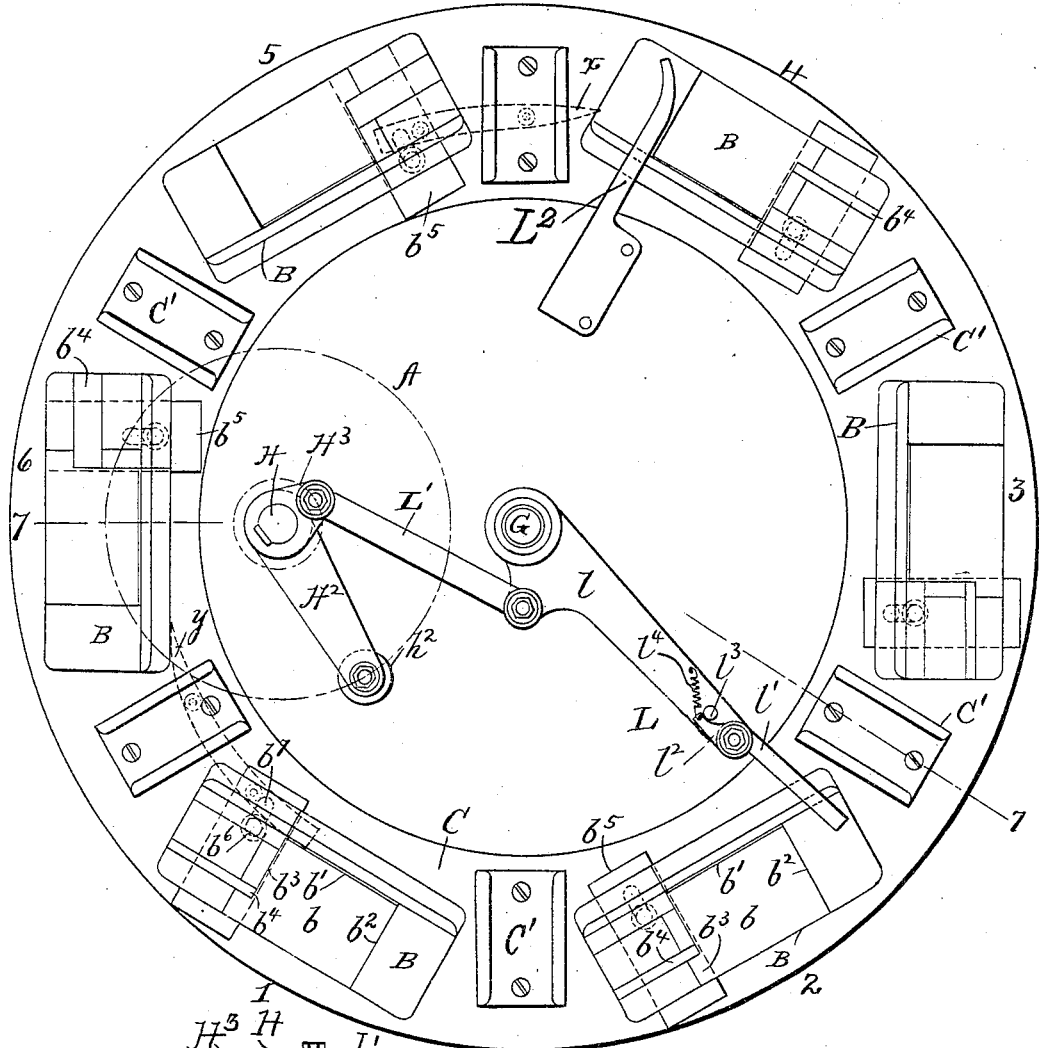
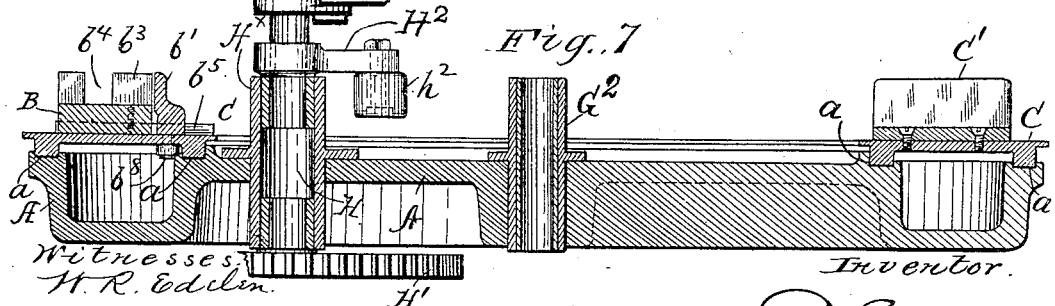
Witnesses:
H. R. Edelin.
H. B. Merkam.
Inventor.
S. T. Cameron No. 778,564. PATENTED DEC. 27, 1904.
S. T. CAMERON.
BROOM MAKING MACHINE.
APPLICATION FILED JAN. 27, 1900.

6 SHEETS—SHEET 4.

Witnesses
Inventor

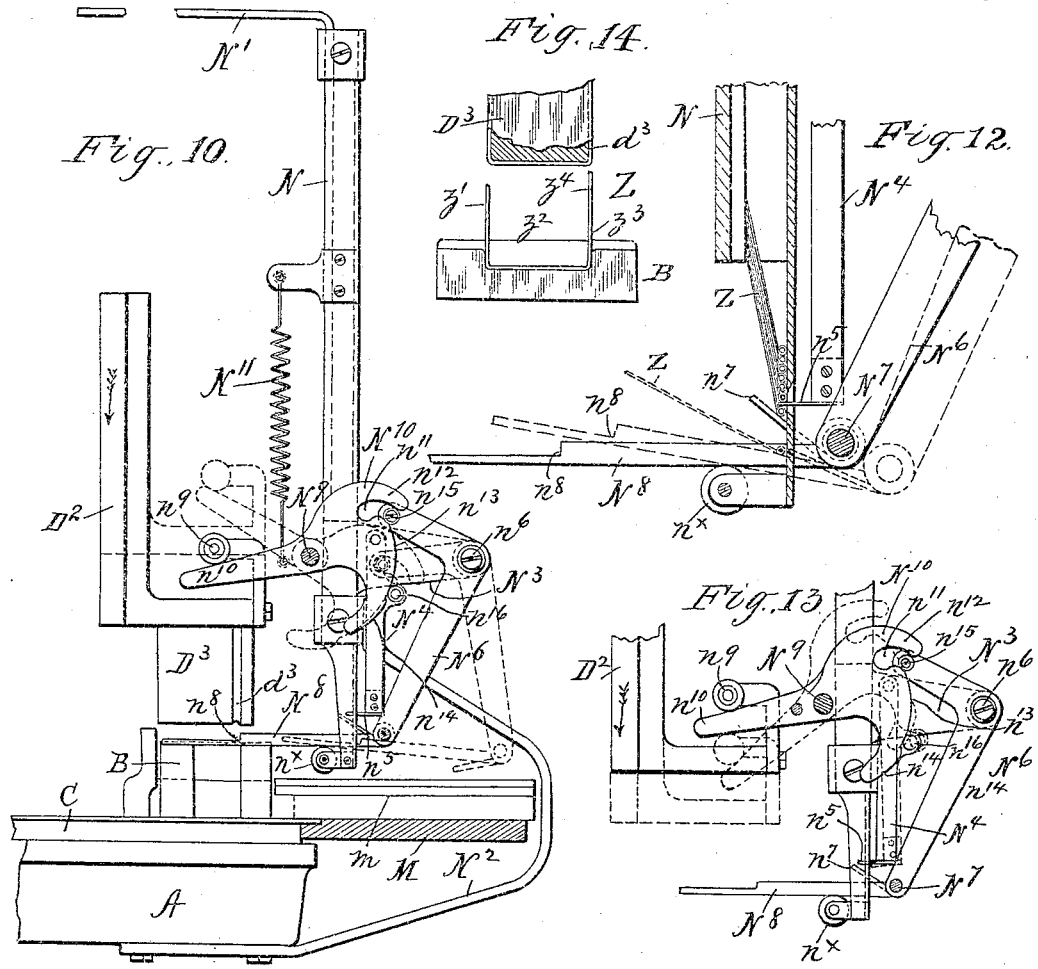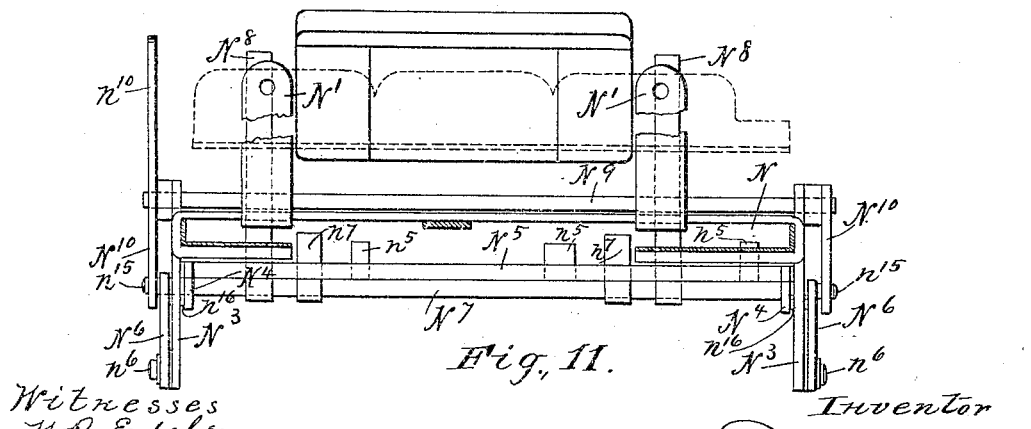

No. 778,564. PATENTED DEC. 27, 1904.
S. T. CAMERON.
BROOM MAKING MACHINE.
APPLICATION FILED JAN. 27, 1900.

6 SHEETS—SHEET 6.

Witnesses.
W. R. Edelin.
W. B. Sterkam.

Inventor
S. T. Cameron

No. 778,564. Patented December 27, 1904.

UNITED STATES PATENT OFFICE.

SHELTON T. CAMERON, OF WASHINGTON, DISTRICT OF COLUMBIA.

BROOM-MAKING MACHINE.

SPECIFICATION forming part of Letters Patent No. 778,564, dated December 27, 1904.

Application filed January 27, 1900. Serial No. 3,012.

*To all whom it may concern:*

Be it known that I, SHELTON T. CAMERON, of Washington, District of Columbia, have invented a new and useful Improvement in Broom-Making Machines, which invention is fully set forth in the following specification.

My invention relates to the art of making brooms. In my United States Letters Patent No. 649,042 I have shown a broom having a core or central portion comprising broom-corn held together by a folded metallic plate or clip which by its folds both surrounds the broom-corn and separates it into layers.

The object of the present invention is to provide a machine whereby in the manufacture of brooms a metallic clip of the character described in said patent may be folded or wound around a quantity of broom-corn either to form the broom-core described in said patent or to form a complete broom-head.

With this object in view the invention consists of a series of forming-blocks or female dies secured to a suitable support capable of intermittent movement in combination with a series of plungers which operate to fold or bend the metallic clip around the broom-corn and firmly press the same so as to cause the bead on the clip to securely clamp and hold the corn. In its preferred form the machine is provided with power-operated mechanism for imparting intermittent movement to the forming-blocks and their support and to actuate the plungers. Furthermore, means may be and preferably are provided to partially fold or bend down the end lobes or portions of the metallic clip preparatory to the action of the plungers thereon. The machine is so constructed that an operator may place the clips one by one in position on the forming-blocks for the action of the initial plunger; but I prefer to employ an automatic clip-feeding device to perform this function. Moreover, the broom-corn may be placed in proper position in the clips by an operator or operators; but preferably automatic corn-feeding mechanism is employed for this purpose, and, finally, while the finished broom-head or broom-core may be removed from the machine by hand, I prefer to employ an automatically-operated ejecting device for this purpose.

The inventive idea involved in my improved machine may receive various mechanical expressions, one of which I have shown in the accompanying drawings; but it is to be understood that said drawings are designed merely for the purpose of illustration and are not to be taken as defining the limits of the invention.

Figure 9:
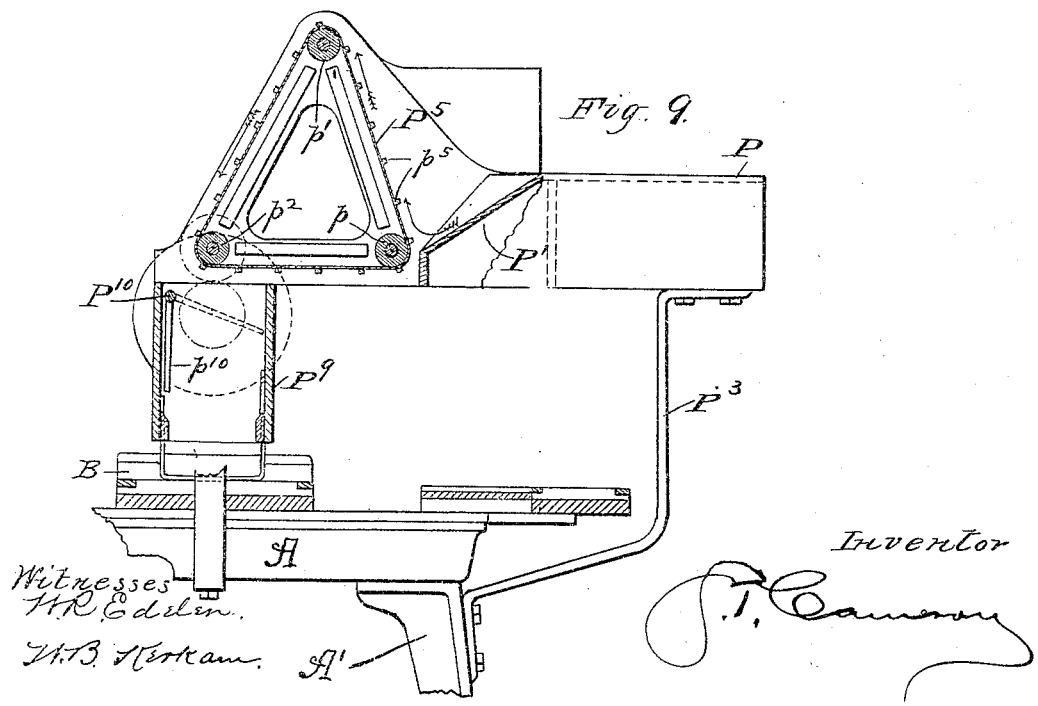
Figure 16:
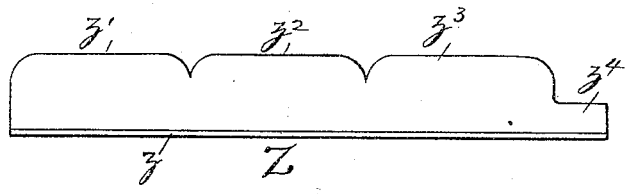
Figure 15:
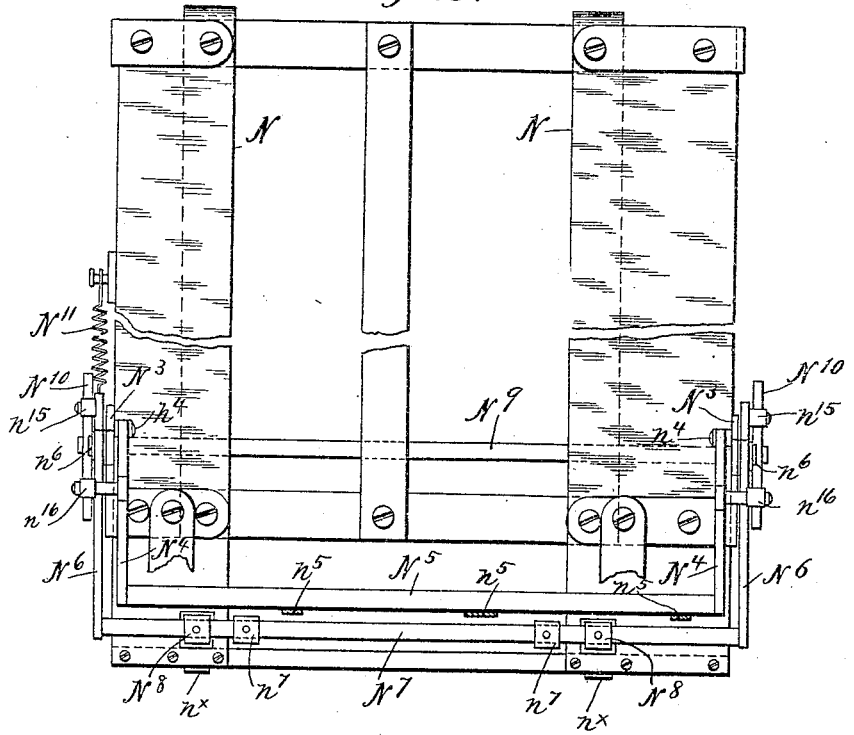

In said drawings, Figure 1 is a side elevation of a machine embodying my invention, parts being in section. Fig. 2 is a plan of one form of plunger-head. Fig. 3 is a vertical section on line 3 3 of Fig. 2. Fig $3^a$ is a perspective view of the forming-block. Fig. 4 is a plan view of the machine. Fig. 5 is an enlarged section or detail of a part of the corn-feeding devices. Fig. 6 is a plan view of the forming-blocks and their intermittently-moving support, together with the means for imparting intermittent movement to said support. Fig. 7 is a vertical sectional view taken on the line 7 7 of Fig. 6. Fig. 8 is a plan view of one form of automatic corn-feeding mechanism that may be employed; and Fig. 9 is a view in vertical section, showing the operation thereof. Fig. 10 is a side elevation of one form of clip-feeding device that may be employed, together with a forming-block and plunger. Fig. 11 is a plan view of said clip-feeding device, and Figs. 12 and 13 are detail views thereof. Fig. 14 is a detail view showing a forming-block and plunger as the latter is moving upward after having struck up or bent a clip in the forming-block. Fig. 15 is a front elevation of the clip hopper or magazine and clip-feeding devices shown in Fig. 10, and Fig. 16 is a plan view of one form of clip.

Referring to the drawings, A is a bed-plate, preferably of cast metal and suitably supported, as by legs A'.

B B are forming-blocks arranged on a suitable support capable of intermittent movement, which support is here shown in the form of an annular table C, mounted for movement on a track or way $a$, formed on the bed-plate A.

D D D, Figs. 1 and 8, are suitable standards or supports projecting upward from the bed-plate A and within the circle formed by the track or way $a$, upon which the annular table C travels. To the upper portions of the supports D is secured a framework affording bearings for the driving mechanism of the machine.

E is a driving-pulley on the main shaft F, upon which shaft is secured a gear-wheel F' and a bevel-gear $F^2$, which latter gear meshes with a bevel-gear G' on a vertical shaft G, extending down through bearings $G^2$, Fig. 7, in the bed-plate A and carrying on its lower end a gear $G^3$, meshing with a gear H' on a shaft H, Fig. 6, turning in bearings $H^\times$, also formed in the bed-plate A, as shown in Fig. 7.

Turning in bearings at the top of the machine is a shaft I, having a gear I' meshing with the gear F' on the main shaft F and a bevel-gear $I^2$ meshing with the bevel-gears $I^3 I^4$, which latter gears are secured to and turn with shafts $I^5 I^6$, projecting radially outward from the center of the machine and having crank-arms K K' keyed to their outer ends, while the shaft I bears a similar crank-arm $K^2$, keyed to the end thereof opposite to the end upon which the gear $I^2$ is secured. Preferably the outer bearings of the shafts $I^5 I^6$ and the bearing for the right-hand end of the shaft I, Figs. 1 and 4, are located one above each of the standards D, each of which has a face-plate D', serving as a guideway for a vertically-reciprocating plunger-carrier $D^2$, bearing a plunger-head $D^3 D^{31}$, connected by a pitman $D^4$ to the respective crank-arms K K' $K^2$. The guideways D' are carried by the standards D, projecting outwardly over the revolving table C, which supports the forming-blocks B, as will be understood from an inspection of Figs. 1 and 8, so that the plungers $D^3 D^{31}$ are immediately over the forming-blocks. As is clearly shown in Fig. 8, the standards D, and hence the plungers $D^3 D^{31}$, are symmetrically located on the bed-plates A with an arc of one hundred and twenty degrees between them. Preferably two of these plungers $D^3$ are provided with a groove $d^3$, extending across the face and up the opposite sides thereof, the groove on one of the plungers being equal in depth to the diameter of the bead $z$ on the metallic clips Z, while that on the other plunger is equal in depth to about one-half the diameter of said bead. Ordinarily no groove is provided in the third plunger $D^{31}$.

Referring now to Figs. 1, 6, and 7, the forming-blocks B are female dies, six in number, preferably of metal, removably attached by bolts or otherwise to the intermittently-revolving table C, being symmetrically arranged thereon, so that there is an intervening arc of sixty degrees between the centers of adjacent blocks. Each of the blocks B has a central depression $b$, having a rear wall $b'$ and end walls $b^2 b^3$, but without any wall on that side of the depression adjacent to the outer edge of the table C. The distance between the walls $b^2 b^3$ is just equal to the width of the broom or broom-core to be formed therein, and the blocks B are preferably removable from the table C in order that forming-blocks for different sizes of brooms or broom-cores may be substituted, if desired. The walls $b'$ and $b^2$ are or may be solid or unbroken; but the wall $b^3$, which is on the left-hand end of the depression $b$, has an opening $b^4$ therein, the width of which opening is rendered adjustable by a portion of said wall mounted on a slide $b^5$, moving in a mortise in the under side of the block, said slide having a pin $b^6$ extending through a slot $b^7$ in the table C and preferably having an antifriction-roller $b^8$ on its end which projects below the table C. When the slide $b^5$ is pushed in toward the center of the machine, as in Fig. 7, the opening $b^4$ is of considerable width; but when the slide is pushed out toward the outer edge of table C the opening $b^4$ is nearly closed. For the purpose of moving the slide $b^5$ two cams $x$ and $y$, Fig. 6, are supported on the bed-plate beneath the table C, the cam $x$ being arranged to engage each of the rollers $b^8$ on its outer side and shift the slide $b^5$ toward the center of the machine, thus broadening the opening $b^4$, while the cam $y$ is arranged to engage the inner side of the roller $b^8$ and shift the slide $b^5$ toward the outer edge of the machine, thus nearly closing the opening $b^4$.

Any well-known means for imparting intermittent movement to the forming-block support or table C may be employed. I have shown the table C as provided with channel-blocks C', six in number, U-shaped in cross-section, and symmetrically secured to the table between the forming-blocks, while keyed to the shaft H is a crank-arm $H^2$, having an antifriction-roller $h^2$, whose path of movement during about two-fifths of a revolution of the crank-arm $H^2$ is within one of the channel-blocks C', as shown by dotted lines in Fig. 6.

The operation of the machine as thus far described is as follows: Power being applied to driving-pulley E, the gear $F^2$ on the shaft F turns the gear G' on the shaft G, which operating through gears $G^3$ and H' thereby imparts revolution to the shaft H and its crank-arm $H^2$, which engages the channel-blocks C' and gives the table C an intermittent or step-by-step movement. The gear F' on the shaft F engages the gear I' on the shaft I, which, through the gears $I^2$, $I^3$, and $I^4$, imparts revolution to the shafts $I^5$ and $I^6$, thereby revolving the crank-arms K, K', and $K^2$, whereby the plungers $D^3 D^{31}$ are reciprocated. Preferably the crank-arms K K' $K^2$ are so arranged or timed in their movements that no two of the plungers are at the bottom of their strokes at the same moment, thereby more evenly distributing the strain on the machine; but each plunger nevertheless completes its downstroke during each interval of rest of the table C, the timing of the strokes of the plungers being such that each plunger enters and is withdrawn from the depression in a block while the table C is at rest. As shown in the drawings, the interval of rest for the table C and its supported forming-blocks considerably exceeds that of the interval of motion, the proportion as shown being about as three is to two. If a clip Z has been laid with its middle lobe $z^2$ over a forming-block, before a plunger $D^3$ enters the depression $b$ in said block the bead $z$ on the clip will enter the groove $d^3$ on the plunger as the latter descends and the clip will be forced into the forming-block, being bent into U shape, with its middle lobe $z^2$ at the bottom of the depression $b$ and the lobes $z'$ and $z^3$ forming the opposite sides of the U, as clearly shown in Figs. 1 and 14. With the clips in this position in the forming-block broom-corn is placed therein with the brush ends projecting outward and one of the vertical lobes, as $z'$, of the clip is bent down thereon. The next movement of the table C brings the block and clip under the next plunger $D^3$, which firmly presses the lobe $z'$ down upon the corn. During the next succeeding interval of rest a second supply or portion of broom-corn is placed in the clip and the lobe $z^3$ bent down thereon, which is then by the next movement of the table C brought under the third and final plunger $D^{31}$, which firmly presses the lobe $z^3$ into position. During the action of the first plunger $D^3$ the bead $z$ on the clip enters the deep groove in the plunger, so that when the plunger is withdrawn the bead projects wholly on the inner surface of the clip; but as the groove on the second plunger $D^3$ is but one-half the depth of the diameter of the bead $z$ the plunger will act along that portion of the clip on which it presses—that is, along lobe $z'$—to shift the bead so that it will be left projecting substantially equal distances on each side of the blade of the clip, so that it will bite into the layer of corn above as well as that below the lobe $z'$. The third and last plunger $D^{31}$, which has a plane ungrooved face, presses the lobe $z^3$ firmly upon the last layer of corn with the bead entirely on the inner surface of said lobe. It will thus be seen that the two outside lobes—viz., $z^2$ and $z^3$—are left with the bead projecting from the inner surface only, while the lobe $z'$ in the center of the broom or broom-core has the bead projecting from both sides thereof, so that each layer of corn is clamped on both sides by the bead on the clip. The lobe $z^3$ may be retained in its closed position by means of a suitable fastening device, as a nail, but I prefer to provide the clip with an extension $z^4$ on the end of the lobe $z^3$, which extension is snugly bent around the side of the broom or broom-core, so as to securely retain the lobe $z^3$ in its closed position. If desired, both the nail and the extension $z^4$ may be employed. For the purpose of bending the extension $z^4$ around the side of the broom or broom-core the third plunger $D^{31}$ is constructed as shown in Figs. 2 and 3. The plunger-head $D^{31}$ has a horizontal channel $d^4$ formed therein and extending from end to end thereof. Pivoted on a transverse pin $d^5$ is a lever $D^5$, extending entirely through the plunger with its ends projecting from the opposite sides thereof. The right-hand end of this lever has a downwardly-projecting lug $d^6$ thereon, while the opposite (or left hand) end of the lever has a nose $d^7$ bearing against a shoulder $d^8$ on a hook-shaped lever $D^6$, pivoted on pin $d^9$, passing through ears $d^{10}$ on the plunger-head $D^{31}$. If desired, a spring $d^\times$ may be employed to retain the nose $d^7$ of the lever $D^5$ in constant contact with the shoulder $d^8$ on the lever $D^6$. Normally the weight of the lug portion $d^6$ serves to overbalance the lever $D^5$, so as to retain it in the position shown in dotted lines in Fig. 3; but when the plunger descends the lug $d^6$ encounters the solid portion of the forming-block, while the plunger-head $D^{31}$ descends into the recess $b$ in the block. This causes the levers $D^5$ and $D^6$ to shift from the dotted-line to the full-line positions of Fig. 3, thereby folding the extension $z^4$ on the clips Z smoothly around the side or edge of the broom-head or broom-core in a manner that will be readily understood. It is for the purpose of receiving the lugs or extensions $z^4$ on the clip and the lever $D^6$ on the plunger that the opening $b^4$ is provided in the end wall $b^3$ of the forming-block B. (See Figs. 6 and 7.) Just prior to the time for the third plunger to descend the cam $x$ operates the slide $b^5$ to broaden the opening $b^4$, and before another clip is laid upon the block the cam $y$ actuates the slide to nearly close the opening $b^4$, all of which will be clearly understood from an inspection of Fig. 6. After the first plunger has acted to bend the clip into U shape, as shown in Fig. 14, and the corn has been placed in the clip the lobes $z'$ and $z^3$ may in turn be bent slightly inward in order that the plungers may engage and firmly press them into the corn. This bending action may be performed by an operator; but I prefer to employ automatic devices for this purpose.

Referring to Fig. 6, L is a knuckle-jointed lever having the member $l$ hung to turn loosely around the shaft G at the center of the machine and supporting on its outer end the pivoted member $l'$, having a tail $l^2$ engaging the stop-pin $l^3$, with which it is yieldingly held in contact by a spring $l^4$. The arm $l'$ of the lever L projects out over the table C in a plane above the forming-blocks B, while the arm $l$ is connected by a link L' to a crank-arm $H^3$ on the shaft H. The relative adjustment of the crank-arms $H^2$ $H^3$ on the shaft H is such that at the time the table C is being moved one step by the crank-arm $H^2$ (which movement is always in a direction the reverse of that of the hands of a clock) the bending-lever L is moved in the same direction, but at a greater speed, so that the arm $l'$ thereof sweeps over a portion of the face of the forming-block B. It does not sweep entirely across the forming-block, because the lever reaches the limit of its forward movement before it quite reaches the line of the wall $b^2$ of the depression $b$ in said block, and upon reaching the limit of its forward movement the said lever commences its return or backward sweep before the table C has quite come to rest, so that just before the table stops the table is moving in one direction and the bending-lever in the other.

Referring to Figs. 6 and 14, it will be understood that if a clip Z is in the forming-block, as shown in Fig. 14, and the bending-lever sweeps its arm $l'$ across the block from left to right said arm will engage the lobe $z'$ of the clip and bend it down toward lobe $z^3$, the pin $l^3$ preventing the arm $l'$ from turning about its pivot. The lobe $z^3$, however, is not bent, since the bending-lever L reaches the limit of its forward movement just before striking lobe $z^3$ and starts on its return movement, in which the arm $l'$ strikes the lobes $z^3$ and $z'$ of the next succeeding clip, but turns on its pivot without bending them, after which it is thrown out by its spring into position to repeat the operation.

Referring to Fig. 6, the positions of the forming-blocks B are numbered from 1 to 6. In position 1 the clip is placed on the block and acted upon by the first plunger to bend the clip into the shape shown in Fig. 14. In position 2 one portion of the corn for the broom is placed in position within the clip, and as it advances from position 2 to position 3 the bending-lever L acts to bend down lobe $z'$. In position 3 the second plunger acts to firmly press lobe $z'$ down upon the corn. In position 4 a second portion of corn is placed in the clip, and as the block moves from position 4 to position 5 the stationary bending-arm $L^2$, which is rigidly secured to the bed-plate A, engages the lobe $z^3$ of the clip Z and bends it down over the corn. In position 5 the third and last plunger $D^{31}$ acts upon the lobe $z^3$ and extension $z^4$ and completes the operation, and, finally, in position 6 the broom-head or broom-core is removed from the machine. This last step may be done by hand; but I prefer to employ for this purpose the device shown in Fig. 1, in which M is a bracket, preferably of wood, secured to the table C opposite each forming-block, and $m$ is a leaf pivoted to the outer edge of the bracket M at $m'$. An arm $m^2$ on the leaf $m$ projects down through an opening $m^3$, formed in the bracket M, and when the forming-block is in position 6 this arm $m^2$ rests immediately over one arm $m^4$ of a bell-crank lever pivoted to the bed-plate A, the other arm, $m^5$, of which is connected by a link $m^6$ to an eccentric $m^7$ on the shaft H. Just after the table C comes to rest the eccentric $m^7$ acts to throw the bell-crank lever into the position shown at the left of Fig. 1, thereby turning the leaf $m$ about its pivot, so it is inclined away from the block. Normally the leaf $m$ is in the position shown at the right of Fig. 1, and as the broom-corn is placed in the clip the brush of the broom or core being made rests upon and is supported by the leaf $m$, and when the leaf is raised while the block is in position 6 the completed broom head or core is lifted out of the block and slides by gravity off of the leaf $m$. Instead of separate brackets M, secured to the table C, opposite each forming-block I prefer to form an annular extension M' of the table C (see Fig. 4) and hinge the leaves $m$ to said annular extension in the same manner as they are shown hinged to the brackets M in Fig. 1.

The clips Z may be laid by the operator on the forming-block in position 1, ready to be operated upon by the first plunger to be formed into the U shape, (shown in Fig. 14;) but I prefer to employ automatic clip-feeding devices for this purpose.

In Figs. 10 to 15, inclusive, I have illustrated a device which automatically lays the clips one by one upon the forming-blocks just before the first plunger descends within the block. This clip-feeding device is readily attached to and detached from the machine, so that the latter may be operated with or without the attachment, as desired. Referring to said Figs. 10 to 15 and to Fig. 4, N is a hopper or clip receptacle arranged opposite the first plunger and outside of position 1 for the forming-block B. This hopper is supported in position by the metal straps N' N', connecting the hopper to the upper framework of the machine, and by like straps $N^2$, connecting it to the head-plate A. The hopper is preferably an open framework of suitable length to receive the clips Z and of very shallow depth from front to rear. Attached to the sides of the hopper N and projecting outward therefrom are two brackets $N^3 N^3$, to each of which is pivoted at $n^4$ a freely-swinging pendulous lever $N^4$, the lower ends of the levers $N^4 N^4$ supporting a cross-bar $N^5$, having fingers $n^5$ rigidly secured thereto, which fingers when the pendulous levers $N^4$ hang vertical project under the open bottom of the hopper, as shown in Figs. 11 and 12. $N^6 N^6$ are a pair of bell-crank levers pivoted at $n^6 n^6$ to the outer ends of the brackets $N^3 N^3$ and supporting between the lower ends of their longer arms a cross-bar $N^7$, having rigidly secured thereto fingers $n^7$, which also project under the bottom of the hopper when the bar $N^7$ is swung toward the hopper, but moving in an arc slightly below the fingers $n^5$ on the bar $N^5$. In addition to the fingers $n^7$ the cross-bar $N^7$ carries two levers $N^8$, which are loosely pivoted to the bar and extend forward under the hopper N, being each supported by an anti-friction-roller $n^\times$. These levers $N^8$ are recessed or shouldered, as at $n^3$, on their inner ends and are so spaced on the bar $N^7$ that they pass on opposite sides of the forming-block B when the bell-crank levers $N^6 N^6$ occupy the position shown in full lines in Figs. 10, 12, and 13. Extending across the rear side of the hopper and turning in suitable bearings thereon is a shaft $N^9$, having cam-levers $N^{10} N^{10}$ rigidly secured to the opposite ends thereof, one of which cam-levers has an arm $n^{10}$ extending into the path of a projection or lug $n^9$, secured to a vertically-reciprocating part of the machine, here shown as the carrier $D^2$ of the first plunger $D^3$. A spring $N^{11}$ is secured to the arm $n^{10}$ at one end and to some non-moving part of the machine, as the hopper N at the other end, the tendency of the spring $N^{11}$ being to elevate the arm $n^{10}$, and the action of the lug $n^9$ on the plunger-carrier being to depress the arm $n^{10}$ against the tension of the spring $N^{11}$ each time the plunger descends. The cam-lever $N^{10}$ has a notch $n^{11}$ formed in the upper portion thereof, above which notch $n^{11}$ projects a hook-like portion $n^{12}$, while below the notch the lever is struck on an arc $n^{13}$, with the shaft $N^9$ as a center, said arc having a swell $n^{14}$, which is also in the shape of an arc concentric with the shaft $N^9$. Projecting laterally from the end of the short upper arm of the bell-crank lever $N^6$ is a pin $n^{15}$, which rests in the notch $n^{11}$ of the cam-lever $N^{10}$ when the plunger-lug $N^9$ is out of contact with the arm $n^{10}$, and the spring $N^{11}$ holds said arm $n^{10}$ elevated, at which time a pin $n^{16}$ on the lever $N^4$ bears against the arc $n^{13}$ on the cam-lever $N^{10}$. This position of the parts is illustrated in dotted lines in Fig. 10, the lug $n^9$ on the plunger-carrier being shown as just coming into contact with arm $n^{10}$ as the plunger descends.

The operation of the clip-feeding device is as follows: The clips Z being placed in the hopper in the fan-like position shown in Fig. 12 the entire column of clips is sustained by the fingers $n^5$, and the spring $N^{11}$ holds the cam-levers $N^{10}$ in the position shown in dotted lines in Fig. 10, the pins $n^{15}$ being within the notches $n^{11}$ and engaged and held depressed by the hooks $n^{12}$, thereby rocking the bell-crank levers on their axes and throwing the arms carrying the cross-bar $N^7$ with the rigid fingers $n^7$ and the loosely-pivoted levers $N^8$ outward, as clearly shown in dotted lines in said Fig. 10. As the lug $n^9$ depresses the arm $n^{10}$ it rocks the cam-levers $N^{10}$ upwardly, and the notches $n^{11}$ engaging the pins $n^{15}$ on the bell-crank levers $N^6$ carry said pins upward, turning the bell-crank levers on their axes and finally disengaging the pins $n^{15}$ from the notches $n^{11}$. Up to this time the pins $n^{16}$ on the pendulous levers $n^4$ have been in contact with the arcs $n^{13}$ on the cam-levers $N^{10}$ and have therefore had no movement imparted to them. The positions of the parts at this moment are shown in full lines, Figs. 10 and 13, the pins $n^{15}$ just emerging from the slots $n^{11}$ and entering upon the arcs $n^{13}$ and the pins $n^{16}$ having just reached the point where the swells $n^{14}$ on the cam-levers $N^{10}$ begin. The effect of the farther downward travel of the lug $n^9$ is illustrated in dotted lines in Fig. 13.

As the lug $n^9$ moves from the full-line to the dotted-line position the arcs $n^{13}$ move under the pins $n^{15}$, and hence the bell-crank levers $N^6$ remain stationary; but the swells $n^{14}$ act on the pins $n^{16}$ and act to rock the pendulous levers $N^4$ on their pivots, thereby withdrawing the fingers $n^5$ from under the column of clips Z and permitting them to fall upon and be supported by the fingers $n^7$, which are at this moment immediately under the hopper, as shown in Figs. 10, 12, and 13. As the plunger rises the pins $n^{16}$ pass off of the swells $n^{14}$ onto the arcs $n^{13}$, thereby permitting the levers $N^4$ to swing inward, carrying the fingers $n^5$ with them. The lengths of the levers $N^4 N^4$ are so adjusted that the fingers $n^5$ enter the column of clips Z immediately above the head $z$ of the lowermost clip, which clip is left resting upon the fingers $n^7$ while the rest of the column is again supported by the fingers $n^5$. As the plunger continues to rise the hook $n^{12}$ engages the pin $n^{15}$ and depresses it, thereby throwing the bell-crank lever $N^6$ into the dotted line position of Fig. 10. The first effect of this movement is to withdraw the fingers $n^7$ from under the clip resting thereon and allow the beaded edge thereof to descend upon the levers $N^8$, which descent is sufficient to free the upper edge of the clip from the hopper, whereupon the clip turning about its beaded edge falls flat upon the levers $N^8$ with its beaded side up. One of the clips Z in the act of falling into this position is shown in dotted lines in Fig. 12. After the clip has thus fallen upon the levers $N^8$, which occurs when the parts are in the dotted-line position of Fig. 12, the bell-crank levers $N^6$ continue to withdraw until they reach the dotted-line position of Fig. 10, in which the clip drops in front of the shoulders $n^8$ on the levers $N^8$. When the plunger again descends and the levers $N^8$ are thrust inward, as shown in full lines in Figs. 10, 12, and 13, said levers do not move in a horizontal plane, as the swing of the bell-crank levers $N^6$ carries the axis of the levers $N^8$ slightly below the top line of the rollers $n^x$ and then raises said axis until at the end of the inward movement of the levers their axis is slightly higher than the rollers $n^x$. The result of this construction is that the shouldered ends of the levers $N^8$, with the clip therein, are not thrust inward in a horizontal line; but they lift the clip and lay it gently upon the forming-block, the levers $N^8$ being sufficiently far apart to pass on opposite sides of the block. The clip is thus laid upon the forming-block while the plunger is descending and in the exact position desired, and the continued descent of the plunger depresses the central lobe $z^2$ of the clip into the depression $b$ of the forming-block, as shown in Fig. 14. During the time consumed by the plunger in moving down from the full to the dotted line position of Fig. 13 and returning again to the full-line position the pendulous levers $N^4$ move from the full-line to the dotted-line position of Fig. 13 and back again to the full-line position, and the bell-crank levers remain in the full-line position of said figure. This is due to the swell $n^{14}$, which acts on the pin $n^{16}$, while the arc $n^{13}$, being concentric with the cam-lever $N^{10}$, does not move said pin $n^{15}$. The result of this is that the levers $N^8$ remain forward to receive the next clip Z, which is separated from the column by the oscillation of the pendulous levers $N^4$. After the clip has been forced into the forming-block by the first plunger and the block moved from position 1 to position 2 a portion of the corn to form the broom or broom-core is placed in the clip. As heretofore stated, this may be done by hand, but is preferably done by corn-feeding mechanism provided for that purpose. One form of such corn-feeding mechanism is illustrated in Figs. 1, 8, and 9. Immediately opposite position 3 for the forming-block I arrange an arc-shaped shelf or table P, which has a portion $P'$ on the left slanting toward position 2 and a portion $P^2$ on the right slanting toward position 4. This shelf or table P, together with the other portions of the corn-feeding mechanism, is supported above the table C by bracket arms or stays $P^3$, secured to the lower framework of the machine, and by the cross-bars $P^4 P^4$, bolted to the standards D. (See Figs. 8 and 9.) $P^5 P^5$ are carrier-belts located at the extremities of the inclines $P'$ $P^2$, and as the construction and operation of these belts, together with the other mechanism coöperating therewith, are substantially identical a description of one side will suffice for both. Referring to the belt $P^5$ and its coöperating parts, (shown in Fig. 9,) $p$ is a roller located close to the bottom of incline $P'$. $p'$ is a similar roller located above and slightly to the left of roller $p$, while $p^2$ is a third roller in the same plane as roller $p$ and substantially over the center of the forming-block B when in position 2. The carrier-belt $P^5$ passes over the rollers $p$ $p'$ $p^2$ and has pins (or carrier-slats) $p^5$ arranged transversely thereon. The roller $p^2$ is connected, by suitable gearing $p^4$, to a shaft $P^6$, which extends in toward the center of the machine and has rigid therewith a friction-disk $P^7$, engaging a friction-wheel $P^8$, adjustably secured to the shaft G, (see Figs. 1 and 8,) the disk $P^7$ being held in close contact with the friction-wheel by a spring $p^6$, reacting between a shoulder $p^7$ on the shaft $P^6$ and framework.

Immediately under the roller $p^2$ is a hopper $P^9$, preferably open at the inner and outer ends and extending inward only as far as the front or outer line of the forming-block B when in position 2. $P^{10}$ is a shaft located at the top and along one side of the hopper $P^9$ and supported in bearings in the framework with arms $p^{10}$ rigidly secured thereto and extending across the hopper, as shown in dotted lines in Fig. 9 and full lines in Fig. 5, when the shaft is in one position, but hanging vertically in the hopper (see full lines, Fig. 9) when the shaft is partially revolved. For the purpose of giving the shaft the partial turn necessary it has on its inner end a crank-arm $p^{11}$, which is pivoted to link or bar $P^{11}$, (see Fig. 5,) which is pivoted at its upper end to a lever $P^{12}$, fulcrumed at $p^{12}$ to a suitable support projecting upward from the top plate of the frame of the machine. Preferably the levers $P^{12}$ lie in the same vertical plane with their inner ends overlapping, as shown in Fig. 5, one of the levers having its rounded end $p^{13}$ engaging a cam $P^{14}$ on the shaft I, the cam being shaped as shown so that each revolution of the shaft I will raise the inner ends of the levers $P^{12}$ against the tension of their springs $p^{14}$, and thereby rocking the shaft $P^{10}$, so as to throw the arms $p^{10}$ from the dotted to the full line position of Fig. 9. The two shafts $P^{10}$ rock in opposite directions, as shown in Fig. 5.

In operating the corn-feeding mechanism the broom-corn, previously cut to a regular length, is placed on the table P with the brush ends outward and the butt-ends against the inner rail $p^x$ of the table. The workman then shoves the corn to the right and the left down the inclines $P'$ $P^2$, at the bottom of which it is taken up stalk at a time by the carrier-belt and delivered onto the arms $p^{10}$ in the hopper $P^9$. By adjusting the friction-wheel $P^8$ up or down on the shaft G the speed of the carrier-belt may be regulated and the amount of corn fed thereby to the hopper controlled. The cam $P^{14}$ on the shaft I is so timed that the shaft $P^{10}$ is rocked to move the arms $p^{10}$ from the dotted to the full line position of Fig. 9, while the forming-block B is stationary under the hopper. By comparing Figs. 1 and 9 it will be readily understood that when the arms $p^{10}$ are withdrawn from under the corn which has been fed thereon by the carrier-belt the corn falls onto the leaf $m$ with its butt or stalk ends projecting, so as to lie well within the clip, which has been previously struck up in the block by the first plunger in position 1. The corn having been thus placed in the clips, the next step of the machine causes the respective benders and plungers to act as heretofore described.

It will thus be seen that I provide a machine that may be entirely automatic in its operations or which may, if deemed desirable, be only partially automatic, the clips and corn being fed by hand and the bending down of the lobes $z'$ $z^3$ being also performed by the operator.

Having thus described my invention, I claim—

1. In a broom-machine operating with a metallic clip, the combination of a suitable frame and a forming-block supported thereby, with clip-folding and clip-compressing devices whereby the broom-corn is infolded and compressed in the clip.

2. In a machine of the character described, the combination of a suitable frame and a plurality of plungers and operating means therefor carried by the frame, with a forming-block and means successively presenting the block under each plunger.

3. In a machine of the character described, the combination of a suitable frame and a plurality of plungers and operating means therefor carried by the frame, with a plurality of forming-blocks, a movable support therefor, and means imparting intermittent motion to said support.

4. In a machine of the character described, the combination with the machine-frame, the plungers and means operating the same, of forming-blocks, a movable support therefor, means imparting intermittent motion to said support, and clip-bending devices.

5. In a machine of the character described, the combination with the machine-frame, the plungers and means operating the same, of forming-blocks, a movable support therefor, means imparting intermittent motion to said support, and ejecting devices.

6. In a machine of the character described, the combination with the machine-frame, a plurality of plungers and means operating the same, of a plurality of forming-blocks having a depression therein open on one side, a movable support therefor, means imparting intermittent motion to said support and successively presenting the blocks to each plunger.

7. In a machine of the character described, the combination of a suitable machine-frame, a plurality of plungers carried by the frame, and means for operating said plungers, with a plurality of forming-blocks, and intermittently-operating means simultaneously presenting a forming-block under each plunger.

8. In a machine of the character described, the combination with the machine-frame, the plungers and means operating the same, of forming-blocks having depressions therein open on one side, a movable support therefor, means imparting intermittent motion to said support, and clip-feeding devices.

9. In a machine of the character described, the combination with the machine-frame, the plungers and means operating the same, of forming-blocks, a movable support therefor, means imparting intermittent motion to said support, and corn-feeding mechanism.

10. In a machine of the character described, the combination with the machine-frame, the plungers and means operating the same, of forming-blocks, a movable support therefor, means imparting intermittent motion to said support, and mechanism automatically laying the clips on the tops of the forming-blocks.

11. In a machine of the character described, the combination with the machine-frame, the plungers and means operating the same, of forming-blocks, a movable support therefor, means imparting intermittent motion to said support, clip-feeding devices, and corn-feeding mechanism.

12. In a machine of the character described and having a suitable frame, the combination of a movable support, forming-blocks carried thereby, and plungers coöperating with said blocks, with automatic clip-feeding devices, automatic clip-bending devices, and means for operating the movable parts.

13. In a machine of the character described and having a suitable frame, the combination of a forming-block, a plunger, and clip-feeding devices operated by the plunger.

14. In a machine of the character described, provided with a suitable frame, the combination of a forming-block having a depression therein open on one side, a plunger, and adjustable corn-feeding mechanism.

15. In a broom-machine of the character described operating with a clip having an end lug, the combination of the frame, the forming-block, a plunger and an automatic lug-bending device.

16. In a machine of the character described provided with a suitable frame, the combination of a movable support, forming-blocks carried thereby, and plungers coöperating with said blocks, with clip-feeding devices, clip-bending devices, corn-feeding mechanism and means imparting intermittent movement to said support.

17. In a machine of the character described the combination of the machine-frame, the bed-plate, the annular table supported thereby, the forming-blocks having open-sided depressions and supported on said table, a plurality of plungers mounted to reciprocate above said table, and means imparting intermittent movement to the table and reciprocating the plungers.

18. In a machine of the character described, the combination of the machine-frame, the forming-blocks, an endless intermittently-moving carrier for said blocks, and reciprocating plungers coöperating with the blocks, with automatic clip-feeding devices, automatic corn-feeding mechanism, and means operating the movable parts.

19. In a broom-machine of the character described provided with a suitable frame, the combination of a series of forming-blocks having depressions therein open on one side, an endless intermittently-moving carrier for said blocks, and a plurality of plungers coöperating with said blocks, with corn-feeding mechanism located above said blocks and depositing corn therein, and means imparting movement to the carrier, the plungers and the corn-feeding mechanism.

20. In a broom-machine of the character described provided with a suitable frame, the combination of a circular intermittently-moving table, forming-blocks carried by said table and having depressions therein open on the side toward the outer edge of the table, and a plurality of plungers coöperating with said blocks with corn-feeding mechanism delivering corn to some of the blocks simultaneously with the action of the plungers on other blocks, and actuating means for the table, the plungers and the corn-feeding mechanism.

21. In a broom-machine of the character described provided with a suitable frame, the combination with a series of intermittently-movable forming-blocks, of clip-feeding devices, corn-feeding mechanism and plungers, said devices, mechanism and plungers operating simultaneously during the intervals of rest for the blocks, and actuating means for the movable parts.

22. In a broom-machine of the character described provided with a suitable frame, the combination of a series of intermittently-movable forming-blocks, with a plurality of plungers coöperating with alternate blocks in the series during each interval of rest, and actuating means for the blocks and plungers.

23. In a machine of the character described, the combination of the forming-block for receiving the clip, and automatic clip-feeding devices, with automatic corn-feeding mechanism, and clip-bending means.

In testimony whereof I have signed this specification in the presence of two subscribing witnesses.

SHELTON T. CAMERON.

Witnesses:
W. B. KERKAM,
REEVE LEWIS.